US008886474B2

(12) United States Patent
Chimanbhai et al.

(10) Patent No.: US 8,886,474 B2
(45) Date of Patent: Nov. 11, 2014

(54) SYSTEM AND APPARATUS FOR TESTING CABLE

(75) Inventors: Patel Arvindbhai Chimanbhai, Singapore (SG); Xing Zhu, Singapore (SG); Pandya Harshang Nileshkumar, Singapore (SG); Ravi Kishore Doddavaram, Singapore (SG)

(73) Assignee: Psiber Data Pte Ltd, Singapore (SG)

( * ) Notice: Subject to any disclaimer, the term of this patent is extended or adjusted under 35 U.S.C. 154(b) by 412 days.

(21) Appl. No.: 13/226,296

(22) Filed: Sep. 6, 2011

(65) Prior Publication Data
US 2012/0059605 A1    Mar. 8, 2012

Related U.S. Application Data

(60) Provisional application No. 61/380,260, filed on Sep. 6, 2010.

(51) Int. Cl.
*G01R 31/00*    (2006.01)
*G01R 27/00*    (2006.01)
*H04B 3/46*    (2006.01)

(52) U.S. Cl.
CPC .......................................... *H04B 3/46* (2013.01)
USPC .................. 702/58; 702/59; 702/65; 702/75; 702/117; 702/124; 702/189; 379/22; 398/16

(58) Field of Classification Search
CPC ............ G06F 17/5036; G01R 19/2513; G01R 21/133; G01R 31/025; G01R 31/08; G01R 19/0092; G01R 27/02; G01R 13/00; G01R 23/02; G01R 31/021; G05B 2219/1215; H04L 12/2697; H04L 43/50; H04M 11/062; H04Q 11/045

USPC ................ 702/58, 59, 65, 75, 117, 124, 189; 379/22; 398/16
See application file for complete search history.

(56) References Cited

U.S. PATENT DOCUMENTS

| 5,751,152 A *    | 5/1998  | DuBose et al. ............... 324/628 |
| 2003/0053165 A1 | 3/2003  | Nagayama et al. |
| 2005/0249332 A1* | 11/2005 | Chang et al. .................... 379/22 |

FOREIGN PATENT DOCUMENTS

KR    20080093756 A    10/2008

OTHER PUBLICATIONS

"International Search Report and Written Opinion" mailed Jan. 19, 2012, Application No. PCT/US2011/050558.

* cited by examiner

*Primary Examiner* — Janet Suglo
*Assistant Examiner* — L. Anderson
(74) *Attorney, Agent, or Firm* — Timberline Patent Law Group PLLC

(57) ABSTRACT

An apparatus for testing one or more transmission lines is disclosed. The apparatus comprises a processor capable of configuring the apparatus in one of a master mode and a slave mode. The apparatus when configured in the master mode controls the testing of the one or more transmission lines of a cable. The apparatus also includes one or more test modules associated with one or more tests to be performed on the one or more transmission lines. Further, one or more transceivers of the apparatus are capable of one or more of sending and receiving a plurality of signals through the one or more transmission lines. One or more signals of the plurality of signals are associated with the one or more test modules.

15 Claims, 4 Drawing Sheets

SYSTEM AND APPARATUS FOR TESTING CABLE

CLAIM TO PRIORITY

This patent application claims priority to U.S. Provisional Application No. 61/380,260, filed on Sep. 6, 2010, the contents of which are hereby incorporated by reference into this application as if set forth herein in full.

FIELD OF THE INVENTION

The invention, in general, relates to an apparatus for testing a transmission line. More specifically, the invention relates to a cable certification testing apparatus having identical main and remote units for testing the transmission line of a cable.

BACKGROUND OF THE INVENTION

Cable testers are used by technicians who install transmission cables in buildings. When a cable is installed, one end of the cable is typically in the work area (e.g. office cubicles), whereas the other end may be in a server room. To test the transmission cable, the transmission cable may be excited at one end by applying test signals through a main unit. These test signals are received at the other end by a remote unit and one or more measurements corresponding to the applied test signals are indicated on the main unit and the remote unit. Alternatively, the transmission cable may be excited by the remote unit and test signals may be received at the main unit.

The measurements of the tests may be indicated on the main unit as well as on the remote unit through one or more LEDs. However, a proper user interface is not present in the main unit and the remote unit in the existing cable testers. The main unit includes Graphical User Interface (GUI) elements such as a graphical display, a keyboard, and an interface for a storage device. The GUI is used to initiate a test and also to store measurements associated with the tests. However, the remote unit only has some buttons and LED indicators. As a result, detailed test results cannot be viewed from the remote unit, and test results cannot be stored and retrieved from the remote unit.

Thus, the overall process of testing a cable is controlled from the main unit. A technician using the main unit may, for example, select the tests to be performed, choose a file name where the test measurements are to be saved and may also be able to view past results of the measurements of the test being performed. However, due to the absence of a GUI on the remote unit, these operations cannot be performed at the remote unit. A technician using the remote unit may have to walk over to where the main unit is located and perform these operations at the main unit or rely on the technician operating at the main unit to control these aspects of testing.

Thus, there is a need for a method and system wherein, tests may be efficiently controlled both from the main unit as well as the remote unit.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
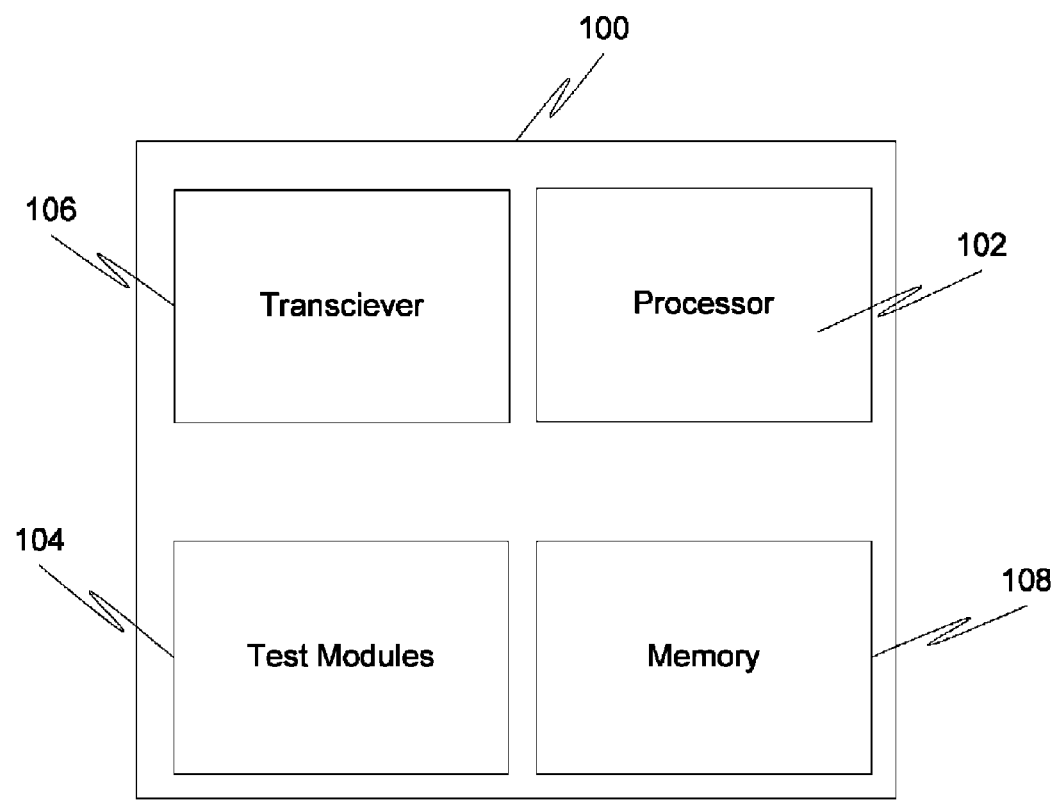
FIG. 1 illustrates an apparatus for testing one or more transmission lines in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of method steps and apparatus components related to a cable testing system having a remote unit identical to a main unit and a method of testing a cable using the cable testing system. Accordingly, the apparatus components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Generally speaking, pursuant to various embodiments, the invention provides an apparatus for testing one or more transmission lines. The apparatus comprises a processor capable of configuring the apparatus in one of a master mode and a slave mode. The apparatus when configured in the master mode controls the testing of the one or more transmission lines of a cable. The apparatus also includes one or more test modules associated with one or more tests to be performed on the one or more transmission lines. Further, one or more transceivers of the apparatus is capable of one or more of sending and receiving a plurality of signals through the one or more transmission lines. One or more signals of the plurality of signals are associated with the one or more test modules.

FIG. 1 illustrates an apparatus 100 for testing one or more transmission lines in accordance with an embodiment of the invention. The one or more transmission lines may be within a cable. In an embodiment the cable may be a transmission cable. In this case, the transmission cable may include one or more data transmission lines which need to be tested. The cable may include, but is not limited to, Ethernet cables, optical cables and telephone cables. Apparatus 100 comprises a processor 102 capable of configuring apparatus 100 in one of a master mode and a slave mode. Apparatus 100, when configured in the master mode controls the testing of the one or more transmission lines of a cable. In an embodiment, apparatus 100 configured in the master mode initiates testing process of the one or more transmission lines. Now when an apparatus such as apparatus 100 is configured in the slave mode, the apparatus may receive instructions from an apparatus acting the master mode to test one or more transmission cables. However, the apparatus configured in the slave mode may be capable of performing operations for managing the testing of the one or more transmission cables upon receiving instructions from the apparatus in the master mode. Further, the apparatus in the slave mode may perform such operations based on user input. This is explained in detail in conjunction with FIG. 2.

Apparatus 100 also includes one or more test modules such as test modules 104. Test modules 104 may be associated with one or more tests to be performed on the one or more transmission lines. The one or more tests may be initiated by apparatus 100. Initiating a test may include, but is not limited to, selecting the one or more tests from a plurality of tests, configuring one or more parameters of the one or more tests, and applying one or more signals of a plurality of signals such as, one or more test signals corresponding to the one or more tests. The mode of selecting the one or more tests is explained in conjunction with FIG. 2.

Once the one or more tests are selected and the one or more parameters associated with the one or more tests are configured, the one or more signals corresponding to the one or more tests are applied by test modules 104. Test modules 104 may be configured to perform the one or more tests on the one or more transmission lines. The one or more tests may include, but are not limited to, a continuity test, a transmission or crosstalk test, a phase measurement test, a resistance measurement test, a capacitance measurement test, a transmission delay test and a test to determine length of the cable or a transmission line.

For testing the one or more transmission lines, one or more transceivers such as transceiver 106 of apparatus 100 performs one or more of sending and receiving a plurality of signals through the one or more transmission lines. One or more signals of the plurality of signals are associated with the one more test modules such as test modules 104. One or more signals of the plurality of signals received at apparatus 100 may be received by transceiver 106 and processed by processor 102. Processor 102 identifies one or more signal characteristics associated with the one or more signals of the plurality of signals received. The one or more signal characteristics may include, but are not limited to, frequency, amplitude and phase. Thereafter, processor 102 selects one or more signal characteristics associated with one or more signals of the plurality of signals sent through the one or more transmission lines based on the one or more identified signal characteristics of the one or more signals received. In an embodiment, the one or more signal characteristics may be selected from a set of signal characteristics. The one or more signal characteristics associated with the one or more signals received may be different from the one or more selected signal characteristics of the one or more signals of the plurality of signals. For example, based on a frequency of a signal received by the apparatus such as apparatus 100 through a transmission line, the apparatus selects a frequency of a signal to be sent through the transmission line. The frequency of the signal to be sent may be different from the frequency of the signal received from the same transmission line. In a scenario, the frequency of the signal sent may be less than the frequency of the signal received. Alternatively, the frequency of the signal sent may be greater than the frequency of the signal received.

Further, the one or more selected signal characteristics of the one or more signals of the plurality of signals may be varied. In an embodiment, the one or more selected signal characteristics may be varied sequentially. For example, one or more frequencies may include f1, f2 and f3. Now initially if a signal sent through a transmission line is f1, then the next signal to send may have a frequency of f2 followed by a signal of frequency f3. However, the one or more frequencies may be ordered in any other fashion other than sequential manner. In addition to identifying the one or more signal characteristics of the one or more signals received, apparatus 100 also performs measurements on the one or more signals to perform testing to identify the state of the one or more transmission lines. The state of a transmission line that may need to be detected may include but are not limited to, transmission delay, leakage of signal and cross-talk between transmission lines. These measurement information stored in a memory 108. This is explained in detail in conjunction with FIG. 2.

Figure 2:
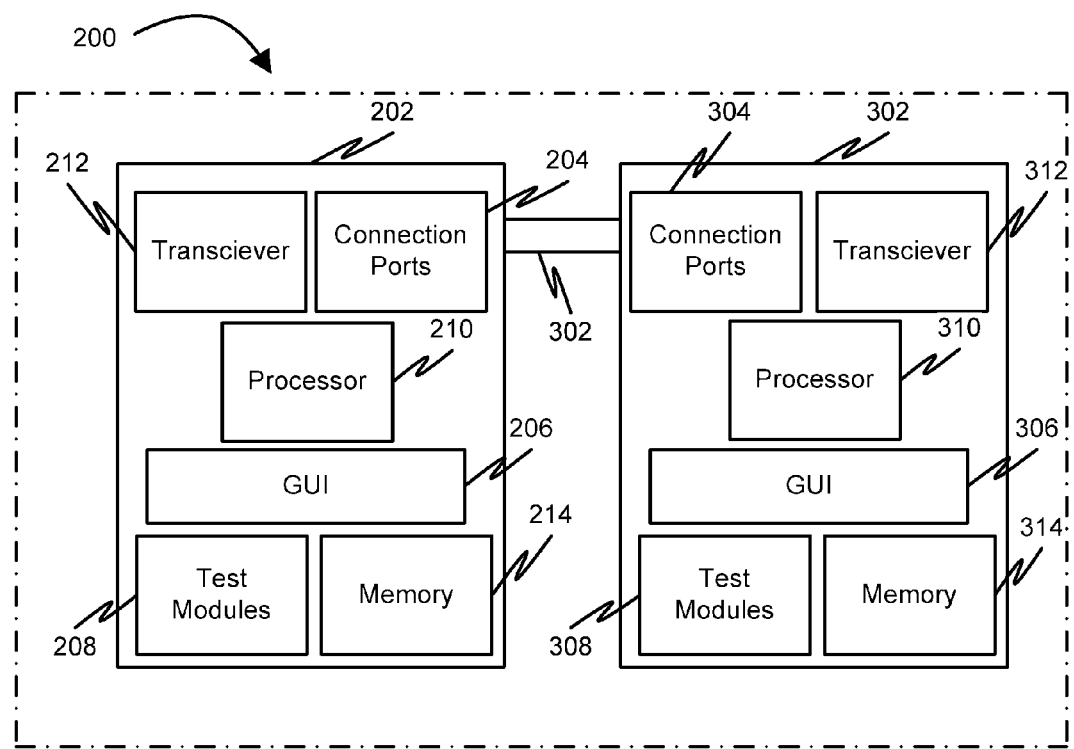
FIG. 2 illustrates a cable tester having a remote unit identical to a main unit in accordance with an embodiment of the invention.

FIG. 2 illustrates a cable testing system 200 including a main unit 202 and a remote unit 302 in accordance with an exemplary embodiment of the invention. Main unit 202 and remote unit 302 may be similar to an apparatus such as apparatus 100 described in conjunction with FIG. 1. Main unit 202 and remote unit 302 each include, but are not limited to, one or more connection ports, a Graphical User Interface (GUI), a processor, one or more test modules, one or more transceivers, and a memory. A transmission cable to be tested is connected between one or more connection ports on main unit 202 such as a connection port 204 and one or more connection ports on remote unit 302 such as a connection port 304. Each transmission cable may include one or more transmission lines. A connection port of the one or more connection ports, for example, may be a RJ45 or RJ11/RJ12 connection port. Although, for the sake of clarity or convenience of description, only one connection port on main unit 202 and one connection port on remote unit 304 are illustrated in FIG. 2, it will be apparent to one skilled in the art that main unit 202 and remote unit 304 may each include a plurality of connection ports without deviating from the scope of the invention.

On connecting the transmission cable, a user may select one of main unit 202 and remote unit 302 as a master unit and the one of main unit 202 and remote unit 302 not selected as the master unit as a slave unit. The master unit may be in a master mode and the slave unit may be in a slave mode. Here, the master unit initiates a test by selecting one or more tests to be performed. Also, the master unit may store measurements of the one or more tests in a memory associated with one or more of main unit 202 and remote unit 302. For example, a user may select main unit 202 to be the master unit. Accordingly, main unit 202 is configured to behave as the master unit and remote unit 302 is configured to behave as the slave unit. In this case, a user may use GUI 206 on main unit 202 to initiate one or more tests. Initiating a test may include, but is not limited to, selecting one or more tests from the plurality of tests, configuring one or more parameters of the one or more tests, and applying one or more test signals corresponding to the one or more tests. The one or more test signals may be applied concurrently from main unit 202 and remote unit 302. Here, selection of the one or more tests and configuration of the one or more parameters associated with the one or more tests is performed through GUI 206 on the main unit. Similarly, remote unit 302 may also include a GUI 306. In an embodiment, a GUI such as GUI 206 and GUI 306 may be a touch sensitive display.

Once the one or more tests are selected and the one or more parameters associated with the one or more tests are configured through GUI 206, one or more signals (hereinafter referred to as one or more test signals) corresponding to the one or more tests are applied by one or more test modules 208 on main unit 202 and one or more test modules 308 on remote unit 302. One or more test modules 208 and one or more test modules 308 may be configured to perform one or more tests on the one or more transmission lines of the transmission cable. Main unit 202 and remote unit 302 may include a processor 210 and a processor 310 to interact with one or more test modules 208 and one or more test modules 308 to perform the one or more tests. The one or more tests may include, but are not limited to, a continuity test, a transmission or crosstalk test, a phase measurement test, a resistance measurement test, a capacitance measurement test, a transmission delay test and a test to determine length of the cable.

Here, both main unit 202 and remote unit 302 concurrently apply test signals to the transmission cable under test. A pair of transceivers is connected between each transmission line of the one or more transmission lines of the transmission cable. Each transceiver of the pair of transceivers is connected at opposite ends of the transmission line. For example, in a case where a single transmission line is present, main unit 202 and remote unit 302 may concurrently apply test signals from both ends of the transmission line. Here, the test signals are applied by the one or more test modules 208 and the one or more test modules 308 associated with main unit 202 and remote unit 302 respectively. The test signals are applied using a transceiver associated with each end of the transmission cable. The test signals concurrently applied from main unit 202 and remote unit 302 are excited using slightly different frequencies. For example, test signals from main unit 202 may be at a frequency f1 and test signals concurrently applied from remote unit 302 may be at a frequency f1' wherein, in an embodiment, the difference between f1 and f1' may be around 50 kHz.

Prior to applying the test signals, main unit 202 and remote unit 302 dynamically synchronize by detecting the signal from the other end on the data transmission line under excitation. This ensures that the timing differences between main unit 202 and remote unit 302 do not impact the measurement results. Moreover, one or more transceivers such as a transceiver 210 and the one or more transceivers such as, a transceiver 312 include a baseband signal processor unit that can separately measure the received signal at frequency f1 and received signal at frequency f1'. Here, main unit 202 determines if remote unit 302 is exciting a data transmission line with an expected frequency at a given instance of time. For example, when main unit 202 expects remote unit 302 to transmit at a frequency f1' on a transmission line 1, main unit 202 verifies if the signal strength at frequency f1' is significantly greater than a predefined noise level. If the signal strength at frequency f1' is greater, then main unit 202 confirms that remote unit 302 is indeed exciting transmission line 1 with frequency f1'.

In a case where the transmission cable includes more than one transmission line, the more than one transmission line may be excited simultaneously by applying test signals from one or more of test modules 208 and test modules 308 through a corresponding pair of transceivers. Simultaneously exciting more than one transmission lines is in addition to concurrently exciting each transmission line from main unit 202 and remote unit 302. Each pair of transmission lines may be simultaneously excited with a different frequency. For example, if the transmission cable comprises four pairs of transmission lines, each of the four pairs of the transmission lines may be excited by main unit 202 with a particular frequency such as a frequency f1, a frequency f2, a frequency f3, and a frequency f4 corresponding to a transmission line 1, a transmission line 2, a transmission line 3, and a transmission line 4 respectively. Accordingly, remote unit 302 concurrently transmits excitations with frequencies f1', f2', f3', and f4' on transmission line 1, transmission line 2, transmission line 3, and transmission line 4 respectively. For each transmission line, a plurality of tests is performed at the corresponding set of frequencies (f1, f1') and subsequently the frequencies are changed sequentially. That is, if transmission line 1 is excited using test signals at frequencies f1 and f1' initially, then on testing the transmission line 1 at frequencies f1 and f1', the transmission line 1 is excited using test signals at frequencies f2 and f2' and so on. The frequencies f1, f2, f3, and f4 may be determined by performing a frequency sweep spanning a range of test frequencies for the transmission cable. The frequencies f1, f2, f3, and f4 correspond to frequency steps of the range of test frequencies.

The concurrently applied test signals from main unit 202 and remote unit 302 vary slightly in frequency. In the above example, if transmission line 1 is excited using a test signal at frequency f1 from main unit 202, then remote unit 302 concurrently excites transmission line 1 using a test signal at a frequency f1'. In an embodiment, the difference between f1 and f1' may be 50 kHz. Due to the difference in frequencies of the test signals, the one or more transceivers, such as transceiver 212 and the one or more transceivers such as, transceiver 312 can differentiate between a received signal transmitted from main unit 202 and a received signal transmitted from remote unit 302.

For example, to test a cable, main unit 202 may transmit test signals at a frequency f1 on a data transmission line 1. Similarly, main unit 202 simultaneously transmits test signals at frequencies f2, f3, and f4 on data transmission line 2, data transmission line 3, and data transmission line 4 respectively. At the same time, remote unit 302 transmits test signals on data transmission line 1 at a frequency f1'. Similarly, remote unit 302 also transmits tests signals at frequencies f2', f3' and f4' simultaneously on data transmission line 2, data transmission line 3, and data transmission line 4 respectively. The frequencies applied by main unit 202 and remote unit 302 on each data transmission line are then sequentially changed to cover the entire range of test frequency steps as explained earlier. Here, the frequency steps (f1, f2, f3, and f4) are separated by a larger frequency range than the frequency differences between the concurrently applied frequencies from main unit 202 and remote unit 302. In other words, the difference between f1 and f2 is larger when compared to the difference between f1 and f1'. These differences in frequency are used by main unit 202 and remote unit 302 to determine if a particular data transmission line is being tested by a corresponding set of frequencies. For example, main unit 202 determines if the signal received from remote unit is f1' when the main unit is transmitting test signals at frequency f1. A baseband signal processor unit associated with each transceiver may be used to determine the frequency of a received signal. If the frequency of a received signal does not match the frequency of the transmitted signal, for example, if f2' is received by main unit 202 when main unit transmits at frequency f1, then main unit 202 and remote unit 302 wait until they are synchronized.

Thereafter, measurements for each data transmission line are made corresponding to the sequentially applied frequency steps. For example, data transmission line 1 is initially excited concurrently by main unit 202 and remote unit 302. In this case, a frequency f1 is transmitted by main unit 202 and a frequency f1' is transmitted by remote unit 302. Here, main unit 202 may measure a return loss corresponding to data transmission line 1 based on the transmitted test signal at frequency f1. Additionally, near end crosstalk on adjacent data transmission lines such as a data transmission line 2, a data transmission line 3, and a data transmission line 4 due to the excitation of data transmission line 1 may be measured. Also, far end crosstalk corresponding to the test signal at frequency f1' may be measured for data transmission line 2, data transmission line 3, and data transmission line 4 by main unit 202. Similar measurements are made concurrently by remote unit 302 with respect to the transmitted signal at frequency f1' and the received signal at frequency f1.

The measurements may then be displayed on one or more of GUI 206 and GUI 306. Main unit 202 may then save these measurements in a memory 214 associated with main unit 202 or in a memory 314 associated with remote unit 302. Further, main unit 202 may communicate with remote unit 302 through transceivers 212 and perform one or more tests from remote unit 302. In other words, a user may select one or more tests through GUI 206 on main unit 202 and thereafter trigger the one or more tests at remote unit 302. Accordingly, test modules 206 may be activated to trigger the one or more tests at remote unit 302. On triggering the one or more tests at remote unit 302, the measurements may be displayed on and stored by one or more of main unit 202 and remote unit 302.

In an embodiment, one or more sets of previous measurements may be displayed on main unit 202 and remote unit 302 to enable the user to compare the present measurements against the previous measurements in order to detect any anomalous conditions.

In another scenario, the role of main unit 202 and remote unit 302 may be reversed. That is, remote unit 302 may be configured to be the master unit and main unit 202 may be configured to be the slave unit. Thus, one or more tests may be initiated from remote unit 302. Here, the one or more tests are selected from a plurality of tests using GUI 306 on remote unit 302. One or more parameters associated with the one or more tests may then be configured. The one or more tests are concurrently triggered by applying test signals from the one or more test modules such as test modules 308 associated with remote unit 302 and one or more test modules 208 associated with main unit 202. The measurements of the one or more tests may then be transmitted to main unit 202 through transceiver 312. Thereafter, the measurements may be displayed and saved on remote unit 302 as well as main unit 202 as explained earlier. Further, remote unit 302 may communicate with main unit 202 through transceiver 312 and perform one or more tests from main unit 202. In other words, a user may select one or more tests through GUI 306 on remote unit 302 and thereafter trigger the one or more tests at main unit 202.

In yet another embodiment, both main unit 202 and remote unit 302 may independently be used to perform tests from one end of the transmission cable. Here, one or more tests of the plurality of tests can be carried out from one end. These tests include, but are not limited to, single-ended fiber testing, cable length measurement, etc. In this case, either main unit 202 or remote unit 302 may be used to perform tests from one end of the transmission cable. Since the main unit and the remote unit possess identical functionalities, either of main unit 202 and remote unit 302 may be used to initiate a test and to save the measurements.

Figure 3:
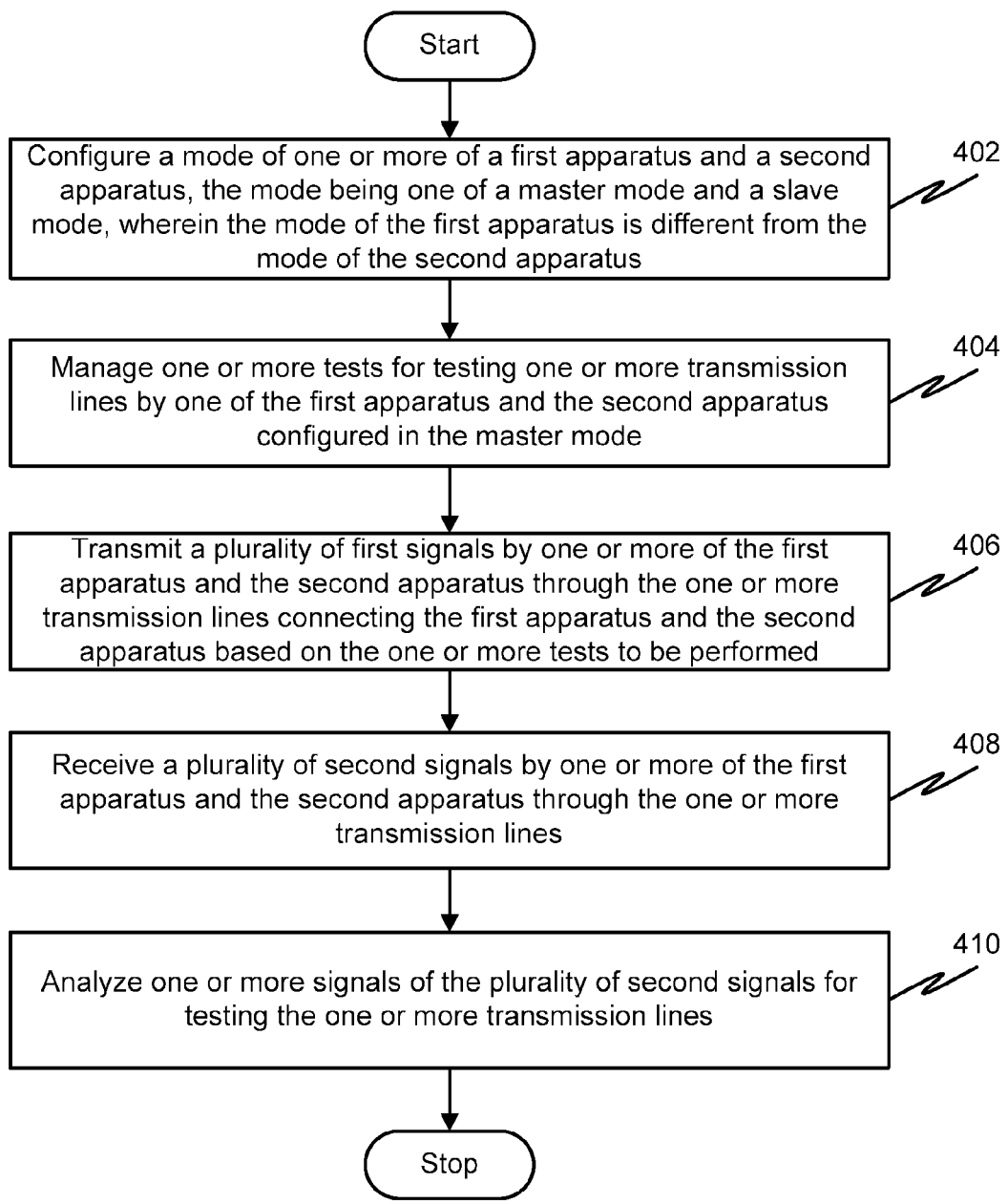
FIG. 3 illustrates a method of testing one or more transmission lines in accordance with an embodiment of the invention.

FIG. 3 illustrates a method of testing a transmission cable in accordance with an embodiment in the invention. The transmission cable may include one or more transmission lines. At step 402, a mode of one or more of a first apparatus and a second apparatus is configured. The first apparatus and second apparatus may be similar to apparatus 100 described in FIG. 1. Further, the one or more transmission lines are connected to the first apparatus and the second apparatus. The mode may be one of a master mode and a slave mode. The mode of the first apparatus is different from the mode of the second apparatus. The mode of the first apparatus and the second apparatus may be configured based on user input received in one or more of the first apparatus and the second apparatus. This explained in detail in conjunction with FIG. 2.

Thereafter one of the first apparatus and the second apparatus configured in the master node manages one or more tests for testing the one or more transmission lines at step 404. For example, the first apparatus may be configured in the master node and thereafter, the first apparatus may send instructions to the second apparatus to be configured in the slave mode. The instructions are sent by the first apparatus upon receiving the user input. In this scenario, the first apparatus selects the one or more tests to be performed on the one or more transmission lines. Then tests to be performed by the second apparatus are communicated by the first apparatus configured in the master mode. In an embodiment, the tests to be performed are selected by the first apparatus based in a predefined manner. The one or more tests may be associated with the one or more test modules present in the first apparatus. The one or more tests may be associated with one or more signals, such as test signals. The tests to be performed by the second apparatus may be also associated with one or more test modules present in the second apparatus.

Once the one or more tests are selected, one or more of the first apparatus and the second apparatus transmits a plurality of signals through the one or more transmission lines at step 406. A signal of the plurality of signals is associated with a test of the one or more tests. In an embodiment, one or more first signals of the plurality of first signals may be transmitted by the first apparatus through a transmission line of the one or more transmission lines concurrently during transmission of one or more first signals of the plurality of first signals by the second apparatus through the one or more transmission lines. In another embodiment, the one or more first signals may be transmitted by the second apparatus after a small time period since the transmission of the one or more first signals by the first apparatus.

Further, a plurality of second signals is received by one or more of the first apparatus and the second apparatus through the one or more transmission lines at step 408. For example, one or more second signals of the plurality of the second signals may be received through the transmission line by each of the second apparatus and the first apparatus. Once the plurality of second signals is received, one or more of the first apparatus and the second apparatus analyze one or more second signals of the plurality of second signals by one or more of the first apparatus and the second apparatus at step 410. More specifically, the first apparatus may identify one or more signal characteristics of the one or more second signals of the plurality of second signals received by the first apparatus. Similarly the second apparatus may identify one or more signal characteristics of each second signal of the plurality of second signals received by the second apparatus.

Now based on one or more signal characteristics received by a second signal in each of the first apparatus and the second apparatus, the first apparatus and the second apparatus identifies one or more signal characteristics of one or more first signals to be subsequently transmitted by the first apparatus and the second apparatus. Thus, the first apparatus selects one or more signal characteristics associated with one or more first signals of the plurality of first signals transmitted by the first apparatus based on one or more identified signal characteristics of the one or more second signals received by the first apparatus in a transmission line of the one or more transmission lines. Further, the second apparatus selects one or more signal characteristics associated with one or more first signals of the plurality of first signals transmitted by the second apparatus based on one or more identified signal characteristics of the one or more second signals received by the second apparatus in a transmission line of the one or more transmission lines.

In an embodiment, a second signal may be received at the first apparatus during the same time period when a first signal is sent by the first apparatus. Alternatively, the first apparatus may receive a signal during the same time period when the first apparatus sends a first signal. Thus, the signal may be sent for a short time period which may overlap with the first signal sent by the first apparatus. The first apparatus may identify one or more signal characteristics of the signal and subsequently send the first signal having different one or more signal characteristics from the signal. In another embodiment, the first signal may be sent during a different period as compared to a time period within which the signal may be received. For example, the signal may be received first and then the first signal may be sent by the first apparatus. Thus, the one or more signal characteristics associated with one or more first signals of the plurality of first signals transmitted by the first apparatus may be different from one or more first signals of the plurality of first signals transmitted by the second apparatus.

Figure 4:
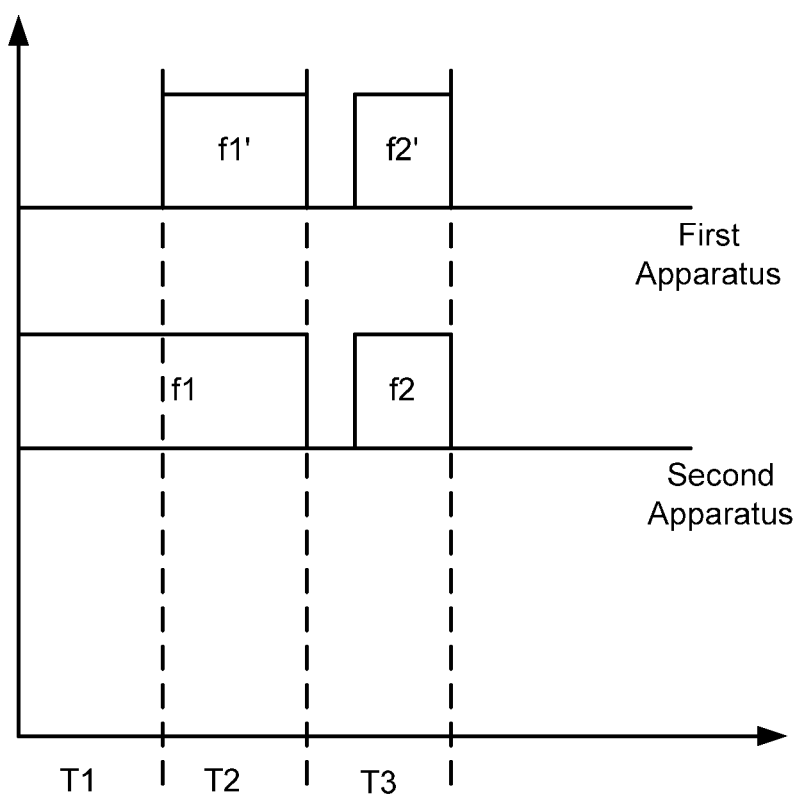
FIG. 4 illustrated a timing diagram in accordance with an embodiment of the invention.

Now explaining by way of a timing diagram as illustrated in FIG. 4 in accordance with an embodiment. In this case, the first apparatus may be configured in the master mode and the second apparatus may be configured in the slave mode. Thus, the first apparatus manages the testing of one or more transmission lines connecting the first apparatus and the second apparatus. The timing diagram only depicts signals transmitted by the first apparatus and the second apparatus for sake of convenience of description, however the first apparatus and the second apparatus also receives signals transmitted through a transmission line. Moreover, the timing diagram is not drawn to scale and thus time periods and transmitted signals are just depicted for sake of convenience of description. Further, the first apparatus may have a predefined set of frequencies including frequencies such as, f1' and f2' and the second apparatus may have a predefined set of frequencies such as, f1 and f2. In an embodiment, both these predefined set of frequencies may be same. For example, f1 and f2' may be 500 K Hertz (Hz) and f2 and f1' may be 550 KHz.

Initially, the second apparatus may send a first signal through a transmission line. A frequency of the first signal sent is f1. The first apparatus may receive the first signal of frequency f1 during a time period T1 from the second apparatus. Once the first apparatus receives the first signal, the first apparatus measures the first signal to identify its frequency as f1. Thus the first apparatus identifies that the second apparatus is going to send the signal of the frequency f1. Upon measuring the first signal received from the second apparatus, the first apparatus sends the first signal at a different frequency f1' at time period T2. During this time period T2, the second apparatus may continue to send the first signal at the frequency f1. For example, the first apparatus sends the first signal at 550 K Hz and the second apparatus sends the first signal at 500 K Hz. The first signal of frequency f1 may be received as a second signal at the first apparatus. Similarly, the first signal of frequency f1' may be received as a second signal at the second apparatus. So in the time period T1, the first apparatus and the second apparatus synchronize themselves to send signals at different frequency through the transmission line. Thus in subsequent transmissions, the first apparatus and the second apparatus may transmit first signals at different frequencies selected from their respective predefined set of frequencies.

Thereafter, the first apparatus and the second apparatus may send first signals at frequency f2 and f2' respectively after a small time gap at time period T3 as illustrated in FIG. 4. For example, the first apparatus sends a first signal of a frequency 500 KHz and the second apparatus sends a first signal of a frequency 550 KHz. Thus as the synchronization between the first apparatus and the second apparatus happened in the time period T1, the first apparatus and the second apparatus can send first signals at different frequencies in the time period T3.

Various embodiments of this disclosure provide an apparatus for testing a transmission cable, a cable testing system including an identical main unit and remote unit and a method of testing a cable using an identical main unit and remote unit. The cable testing system as disclosed herein allows testing a transmission cable comprising one or more data transmission lines from the main unit as well as the remote unit. More specifically, a test may be initiated from either the main unit or the remote unit through a GUI associated with the main unit or a GUI associated with the remote unit respectively. Similarly, measurements of various tests may be saved in a required location using the GUI associated with the main unit or the GUI associated with the remote unit.

Additionally, both the main unit and the remote unit may concurrently apply test signals at slightly varying frequencies in order to test the transmission cable. Further, the one or more data transmission lines may also be excited and measured simultaneously.

Also, since the main unit and the remote unit may be dynamically synchronized, one main unit may be used with multiple remote units and vice-versa. For example, if multiple cables that terminate at a common point, say a server room, are to be tested, one main unit at the server room may be used to alternate between the different cables instead of having multiple main units at the server room.

Those skilled in the art will realize that the above recognized advantages and other advantages described herein are merely exemplary and are not meant to be a complete rendering of all of the advantages of the various embodiments of this disclosure.

In the foregoing specification, specific embodiments of this disclosure have been described. However, one of ordinary skill in the art appreciates that various modifications and changes can be made without departing from the scope of this disclosure as set forth in the claims below. Accordingly, the specification and figures are to be regarded in an illustrative rather than a restrictive sense, and all such modifications are intended to be included within the scope of this disclosure. The benefits, advantages, solutions to problems, and any element(s) that may cause any benefit, advantage, or solution to occur or become more pronounced are not to be construed as a critical, required, or essential features or elements of any or all the claims. This disclosure is defined solely by the appended claims including any amendments made during the pendency of this application and all equivalents of those claims as issued.

What is claimed is:

1. An apparatus for testing at least one transmission line, the apparatus comprising:

a first unit attachable to a first end of the at least one transmission line;

one or more additional units attachable to one or more other ends of the at least one transmission line;

a graphical user interface on the first unit and on each of the one or more additional units;

the first unit and each of the one or more additional units configurable in either a master mode or a slave mode through a user input from a corresponding graphical user interface or remotely through a user input from the graphical user interface of another unit;

a processor in the first unit and in each of the one or more additional units, each processor upon receiving a signal from at least one graphical user interface, capable of configuring the corresponding unit in a master mode or a slave mode and capable of configuring another unit in a master mode or a slave mode;

wherein a unit configured in the master mode selects tests to apply at a corresponding end of the at least one transmission line and signals one or more other units configured in the slave mode to perform tests at one or more ends of the at least one transmission line connected to the one or more other units;

at least one test module in the first unit and in each of the one or more additional units, each test module associated with at least one test to be performed on the at least one transmission line; and at least one transceiver in the first unit and in each of the one or more additional units for at least one of sending and receiving a plurality of signals through the at least one transmission line, at least one signal of the plurality of signals being associated with the at least one test module, and at least one signal characteristic of the at least one signal varied sequentially by the at least one test module during the at least one test to detect a state of the at least one transmission line, the signal characteristic selected from one of a frequency, a phase, and an amplitude of the at least one signal.

2. The apparatus of claim 1, further comprising:

a memory;

wherein each test module is configured to:

receive at least one signal and analyze each corresponding sequentially varied signal characteristic associated with the at least one signal;

perform a measurement based on the at least one signal and the sequentially varied signal characteristic, the measurement selected from the group consisting of a transmission delay measurement, a leakage measurement of the at least one signal, an attenuation measurement of the at least one signal, a cross-talk measurement associated with the at least one transmission line, a continuity measurement, a phase measurement, a resistance measurement, a capacitance measurement, and a length of cable measurement; and store the measurement in the memory.

3. The apparatus of claim 2, wherein the first unit and the one or more additional units dynamically synchronize with each other;

wherein the first unit and the one or more additional units concurrently test the at least one transmission line; and wherein the first unit and the one or more additional units simultaneously excite one conductor of the at least one transmission line with a plurality of different frequencies to perform the at least one test.

4. The apparatus of claim 3, wherein the first unit and the one or more additional units apply respective signals to the at least one transmission line that vary from each other by approximately 50 kHz at any given time.

5. The apparatus of claim 2, wherein previous measurements of the at least one transmission line stored in the memory and current measurements of the at least one transmission line are displayed and compared with each other on a graphical user interface of the first unit or the one or more additional units.

6. The apparatus of claim 2, wherein the first unit in slave mode or the one or more additional units in slave mode transmit measurements of the one or more tests to the first unit in the master mode or to the one or more additional units in the master mode.

7. The apparatus of claim 1, wherein the at least one transmission line comprises one of an Ethernet cable, an optical fiber, or a telephone cable.

8. A method for testing a transmission line, the method comprising:

configuring a mode of at least one of a first apparatus and a second apparatus, the mode being one of a master mode and a slave mode, wherein the mode of the first apparatus is different from the mode of the second apparatus and the mode of a given apparatus is capable of being configured from the other apparatus;

managing at least one test for testing the transmission line by the first apparatus and the second apparatus, wherein the transmission line connects the first apparatus and the second apparatus;

simultaneously transmitting a plurality of first signals by the first apparatus and a plurality of second signals by the second apparatus through the transmission line based on the at least one test;

and analyzing received signals associated with the plurality of first signals and the plurality of second signals for the at least one test.

9. The method of claim 8 further comprising receiving a user input from a graphical user interface of the first apparatus or the second apparatus for configuring the mode of at least one of the first apparatus and the second apparatus.

10. The method of claim 8, wherein a frequency of at least one signal of the plurality of first signals transmitted by the first apparatus is sequentially varied while transmitted through the at least one transmission line and a frequency of at least one of the plurality of second signals transmitted by the second apparatus through the at least one transmission line is concurrently sequentially varied while transmitted through the at least one transmission line during the at least one test.

11. The method of claim 8 further comprising at least one of:

selecting at least one signal characteristic associated with at least one signal of the plurality of first signals transmitted by the first apparatus based on at least one of the received signals, the signal characteristic selected from one of a frequency, a phase, or an amplitude; and performing a measurement based on the at least one signal characteristic, the measurement selected from the group consisting of a transmission delay measurement, a leakage measurement of the at least one signal, an attenuation measurement of the at least one signal, a cross-talk measurement associated with the at least one transmission line, a continuity measurement, a phase measurement, a resistance measurement, a capacitance measurement, and a length of cable measurement; and storing the measurement in a memory.

12. The method of claim 11, further comprising:
selecting a second signal characteristic associated with at least one signal of the plurality of second signals transmitted by the second apparatus, the signal characteristic selected from one of a frequency, a phase, or an amplitude;
performing a measurement based on the second signal characteristic; and
wherein the at least one signal characteristic associated with at least one signal of the plurality of first signals transmitted by the first apparatus is different from the second signal characteristic associated with at least one signal of the plurality of second signals transmitted by the second apparatus.

13. The method of claim 12 further comprising varying at least one of:
the at least one signal characteristic associated with at least one signal of the plurality of first signals transmitted by the first apparatus; and
the second signal characteristic associated with at least one signal of the plurality of second signals transmitted by the second apparatus.

14. An apparatus for testing a transmission line, comprising:
a first unit attachable to a first end of the transmission line;
a second unit attachable to a second end of the transmission line;
a graphical user interface on each of the first unit and the second unit, each graphical user interface capable of configuring both the first unit and the second unit in either a master mode or a slave mode; and
a test module in each of the first unit and the second unit, wherein each test module simultaneously measures a different plurality of frequencies on one conductor of the transmission line to perform one or more tests.

15. The apparatus of claim 14, wherein the one or more tests include a test selected from the group consisting of a transmission delay test, a leakage test, an attenuation test, a cross-talk test, a continuity test, a phase test, a resistance test, a resistivity test, a capacitance test, and a length of cable test.

* * * * *